United States Patent
Li et al.

(10) Patent No.: US 12,204,977 B1
(45) Date of Patent: Jan. 21, 2025

(54) PROTECTION CASE OF INTELLIGENT TERMINAL AND METHOD FOR USING PROTECTION CASE OF INTELLIGENT TERMINAL

(71) Applicant: Shenzhen Lingyi Innovation Technology Co., Ltd., Shenzhen (CN)

(72) Inventors: Yanhui Li, Shenzhen (CN); Dan Hu, Shenzhen (CN); Yanghui Zheng, Shenzhen (CN); Feng Liu, Shenzhen (CN)

(73) Assignee: Shenzhen Lingyi Innovation Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/777,301

(22) Filed: Jul. 18, 2024

Related U.S. Application Data

(63) Continuation of application No. PCT/CN2024/084410, filed on Mar. 28, 2024.

(30) Foreign Application Priority Data

Aug. 31, 2023 (CN) .......................... 202311129514.2

(51) Int. Cl.
*G06K 19/077* (2006.01)
*H04B 5/79* (2024.01)

(52) U.S. Cl.
CPC ......... *G06K 19/07773* (2013.01); *H04B 5/79* (2024.01)

(58) Field of Classification Search
CPC .......................... G06K 19/07773; H04B 5/79

USPC .......................................................... 235/492
See application file for complete search history.

(56) References Cited

U.S. PATENT DOCUMENTS

| | | | |
|---|---|---|---|
| 10,805,440 B1* | 10/2020 | Pham ....................... | H04M 1/22 |
| 11,451,256 B1* | 9/2022 | Beaulieu ............... | H04M 1/185 |
| 2017/0005684 A1* | 1/2017 | Yang ...................... | H04B 1/3888 |
| 2020/0084605 A1* | 3/2020 | Fraccaroli ............... | H04W 4/21 |
| 2022/0182095 A1* | 6/2022 | Jobe ....................... | H04B 1/3888 |
| 2022/0278557 A1* | 9/2022 | Ding ...................... | G06F 1/1669 |
| 2022/0353084 A1* | 11/2022 | Venable ............... | G06Q 20/352 |
| 2024/0087432 A1* | 3/2024 | Pellegrini ........... | G08B 21/0461 |
| 2024/0211706 A1* | 6/2024 | Jung .................. | G06K 7/10297 |

* cited by examiner

*Primary Examiner* — Allyson N Trail
(74) *Attorney, Agent, or Firm* — Getech Law LLC; Jun Ye

(57) ABSTRACT

The present disclosure discloses a protection case of an intelligent terminal, wherein the protection case of the intelligent terminal includes a housing, a reinforcing sheet, a RFID coil, a plurality of RFID chips and a plurality of switching elements; an inner surface of the housing is provided with a mounting groove, an outer surface of the housing is provided with a positioning groove; the reinforcing sheet is arranged in the mounting groove; the RFID coil is fixedly attached to the reinforcing sheet; the plurality of the RFID chips are mounted in the mounting groove and are electrically connected to the RFID coil, and the plurality of the RFID chips are arranged in parallel; a plurality of switching elements are mounted in the positioning groove, and the plurality of the switching elements are respectively connected in series to circuits where the corresponding RFID chips are connected with the RFID coil.

15 Claims, 7 Drawing Sheets

PROTECTION CASE OF INTELLIGENT TERMINAL AND METHOD FOR USING PROTECTION CASE OF INTELLIGENT TERMINAL

CROSS-REFERENCE TO RELATED APPLICATIONS

This application is a Bypass Continuation of International Application No. PCT/CN2024/084410 filed on Mar. 28, 2024, which claims priority to Chinese Patent Application No. 202311129514.2, filed on Sep. 6, 2019. All the applications are hereby incorporated by reference in their entireties.

TECHNICAL FIELD

The present disclosure relates to the technical field of a protection case of an intelligent terminal, and particularly relates to a protection case of an intelligent terminal and a method for using a protection case of an intelligent terminal.

BACKGROUND ART

Nowadays, intelligent terminals such as smartphones are becoming more and more intelligent. As the functions of smartphones increase, the operation modes of smartphones become complex and diverse. Among them, smartphones are equipped with a touch screen and a virtual switching element on the touch screen is used to achieve human-computer interaction, while smartphones are also equipped with a mechanical switching element to assist consumers to directly trigger some functions, such as making an emergency call, sending information, opening a certain application software, etc.

Although a smart phone carries a mechanical switching element, the number of mechanical switching elements carried on the smart phone is generally two to three; in order to increase the mechanical switching elements which can quickly trigger a certain program or application in the smart phone, the mechanical switching element can be provided on the protection sleeve of the smart phone; the mechanical switching element and the RFID chips and the RFID coil on the protection sleeve are connected in series to form a circuit; and after being triggered, the mechanical switching element can generate an electronic tag which is able to be sensed and read by an NFC module on the smart phone.

However, the provision of a mechanical switching element, RFID chips and a RFID coil on the protection sleeve of a smart phone would lead to the complexity of the structure of the protection sleeve on the one hand and the increase of the overall size of the protection sleeve on the other hand, which should be solved urgently.

SUMMARY OF THE INVENTION

The main object of the present disclosure is to propose a protection case of an intelligent terminal, aiming to solve the problems of the existing protection case of an intelligent terminal being oversized and complicated in structure.

In order to achieve the above-mentioned object, the present disclosure proposes a protection case of an intelligent terminal, including a housing, a reinforcing sheet, a RFID coil, a plurality of RFID chips and a plurality of switching elements, wherein an inner surface of the housing is provided with a mounting groove, an outer surface of the housing is provided with a positioning groove, and the positioning groove is arranged opposite the mounting groove;

the reinforcing sheet is arranged in the mounting groove;

the RFID coil is fixedly attached to the reinforcing sheet;

the plurality of the RFID chips are mounted in the mounting groove and are electrically connected to the RFID coil, and the plurality of the RFID chips are arranged in parallel; and the plurality of the switching elements are mounted in the positioning groove, and the plurality of the switching elements are respectively connected in series to circuits where the corresponding RFID chips are connected with the RFID coil.

In some embodiments of the present disclosure, the housing includes a back plate and a side plate extending in the same direction from an edge of the back plate, the back plate and the side plate together enclosing a mounting cavity for receiving the intelligent terminal, a surface, adjacent to the mounting cavity, of the side plate being concavely provided with the mounting groove, and a surface, facing away from the mounting cavity, of the side plate being provided with the positioning groove.

In some embodiments of the present disclosure, the back plate has a first region arranged opposite an NFC sensing area of the intelligent terminal and a second region arranged opposite a wireless charging sensing area of the intelligent terminal, the first region and the second region being spaced apart, the mounting groove being arranged adjacent to the first region and spaced apart from the second region, the RFID coil having a portion arranged in the first region and the RFID coil having another portion arranged in the mounting groove.

In some embodiments of the present disclosure, the RFID chips have a frequency in the range of 10 MHz to 15 MHz.

In some embodiments of the present disclosure, the RFID coil is adhesively fixed to the reinforcing sheet via bonding by a double-sided adhesive.

In some embodiments of the present disclosure, the RFID coil is provided on a side, facing a groove bottom of the mounting groove, of the reinforcing sheet, the plurality of the RFID chips are all provided on a side, facing the groove bottom of the mounting groove, of the RFID coil and the plurality of the RFID chips are all encapsulated by an encapsulation film.

In some embodiments of the present disclosure, a plurality of avoidance recesses are concavely provided in the groove bottom of the mounting groove, and the plurality of the avoidance recesses are all configured for avoiding arrangement of the RFID chips.

In some embodiments of the present disclosure, the positioning groove is provided in communication with the mounting groove, the switching element comprises a push-type button and a key cap, the push-type button forming a circuit in series with the RFID coil and the corresponding RFID chip, the push-type button being provided at a position where the RFID coil is opposite to the positioning groove, and the key cap cooperating with the positioning groove and being able to reciprocate along the positioning groove to press or release the push-type button.

In some embodiments of the present disclosure, the push-type button is a snap dome button.

In some embodiments of the present disclosure, the RFID chips are arranged on a side, facing the positioning groove, of the RFID coil, and the protection case of an intelligent terminal further comprises a polyester film, the polyester film covering the reinforcing sheet, the RFID coil, the plurality of the RFID chips, and the button. In some embodiments of the present disclosure, the protection case of an intelligent terminal further includes a PET sheet, wherein the PET sheet is penetratingly provided with a first avoidance hole at a position corresponding to the RFID chip, the PET sheet is penetratingly provided with a second avoidance hole at a position corresponding to the button, one side of the PET sheet abuts against the polyester film, and the other side of the PET sheet is adhesively fixed to the RFID coil via a double-sided adhesive.

In some embodiments of the present disclosure, the switching element is a self-resetting knob switch; alternatively, the switching element is an electronic switch, and the protection case of an intelligent terminal further includes a power supply module or a power supply connector, and the electronic switch is electrically connected to the power supply module or the power supply connector.

In some embodiments of the present disclosure, the protection case of an intelligent terminal further includes a decorative plate arranged on a side, facing away from the positioning groove, of the reinforcing sheet, the decorative plate covering a notch of the mounting groove.

The present disclosure also proposes a method for using a protection case of an intelligent terminal, wherein the protection case of an intelligent terminal is as described above, and the method for using the protection case of an intelligent terminal includes:

step S10: placing the intelligent terminal in the housing and arranging an NFC sensing area of the intelligent terminal opposite the RFID coil; and step S20: activating one switching element of the plurality of the switching elements so that a circuit where the activated switching element is located is conductive and generates an electronic tag which is able to be sensed and read by an NFC module of the intelligent terminal.

In some embodiments of the present disclosure, the RFID chips have a frequency in the range of 10 MHz to 15 MHz, and the method for using a protection case of an intelligent terminal further includes:

step S30: activating two or more switching elements of the plurality of the switching elements at the same time, so that circuits where the activated two or more switching elements are located are conductive at the same time and generate an electronic tag which is not able to be sensed by the NFC module of the intelligent terminal.

In the protection case of an intelligent terminal of the present disclosure, the reinforcing sheet is fixedly mounted in the mounting groove, the RFID coil is attached to the reinforcing sheet, the plurality of the RFID chips are arranged in parallel and are electrically connected to the RFID coil, and the plurality of the switching elements are mounted in the positioning groove and are respectively connected in series to circuits where the corresponding RFID chips are connected to the RFID coil. With such arrangement, on the one hand, the positioning of the flexible RFID coil in the mounting groove is facilitated, and on the other hand, the strength at which the housing is provided with the mounting groove and the positioning groove can be increased by means of the reinforcing sheet, so that the thickness of the housing can be made thinner.

BRIEF DESCRIPTION OF THE DRAWINGS

In order to explain the technical solutions of the embodiments of the present disclosure more clearly, the following contents will briefly introduce the drawings which need to be used in the embodiments. It should be apparent that the drawings in the following description are only some embodiments of the present disclosure, and it would be obvious for a person skilled in the art to obtain other drawings according to these drawings without involving any inventive effort.

REFERENCE NUMBERS

Figure 1:
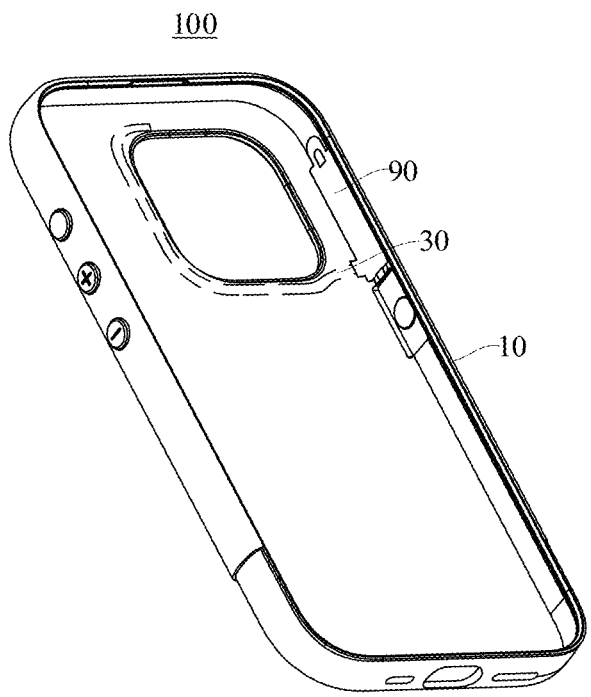
FIG. 1 is a schematic structural diagram of an embodiment of a protection case of an intelligent terminal of the present disclosure.
Figure 2:
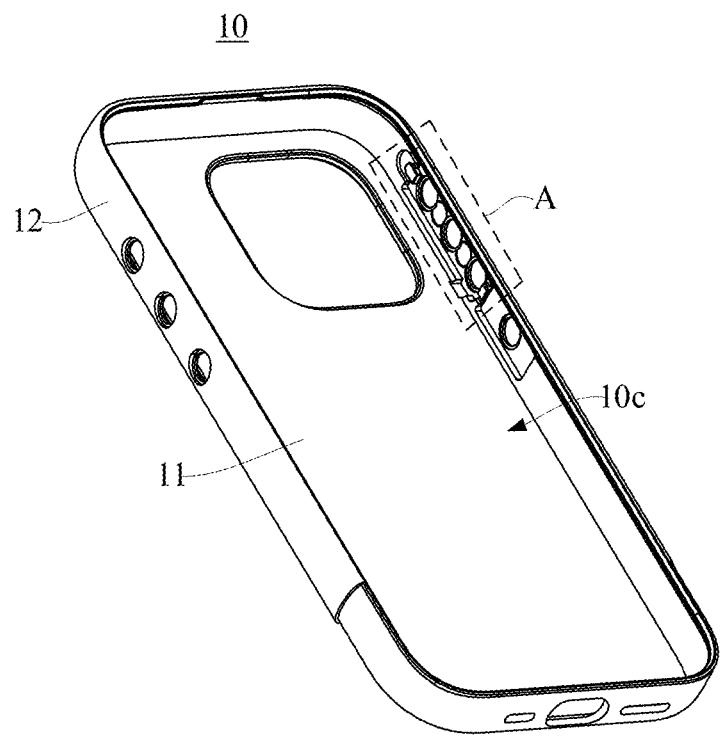
FIG. 2 is a schematic structural diagram of a housing in FIG. 1.

| Reference number | Name |
| --- | --- |
| 100 | protection case of intelligent terminal |
| 10 | Housing |
| 10a | Mounting groove |
| 10b | Positioning groove |
| 10c | Mounting cavity |
| 10d | Avoidance recess |
| 11 | Back plate |
| 11a | First region |
| 11b | Second region |
| 11c | Wiring notch |
| 12 | Side plate |
| 13 | Positioning post |
| 20 | Reinforcing sheet |
| 20a | Positioning hole |
| 30 | RFID Coil |
| 40 | RFID chip |
| 50 | Switching element |
| 51 | Button/push-type button |
| 52 | Key cap |
| 60 | Encapsulation film |

-continued

| Reference number | Name |
|---|---|
| 70 | Polyester film |
| 80 | PET sheet |
| 80a | First avoidance hole |
| 80b | Second avoidance hole |
| 90 | Decorative plate |
| 90a | Fitting hole |
| 91 | Capping block |

The realization of objects, functional features and advantages of the present disclosure will be further described with reference to the accompanying drawings in conjunction with the embodiments.

DETAILED DESCRIPTION OF THE INVENTION

The embodiments of the present disclosure will now be described more clearly and fully hereinafter with reference to the accompanying drawings, in which embodiments of the disclosure are shown. It is to be understood that the embodiments described are only a few, but not all embodiments of the disclosure. Based on the embodiments of the present disclosure, all other embodiments obtained by a person of ordinary skill in the art without inventive effort fall within the scope of protection of the present disclosure.

Referring to FIGS. 1 to 11, the present disclosure provides a protection case of an intelligent terminal 100, which is adapted to an electronic devices equipped with an NFC (Near Field Communication) function, such as a mobile phone, a tablet, etc. and includes a housing 10, a reinforcing sheet 20, an RFID (Radio Frequency Identification) coil 30, two or more RFID chips 40, and two or more switching elements 50, wherein the reinforcing sheet 20, the RFID coil 30, the two or more RFID chips 40, and the two or more switching elements 50 are all provided on the housing 10.

There are various shapes of the housing 10, the housing 10 can be arranged in a flat plate shape, the housing 10 can be arranged in a U-shape, and the housing 10 can also be arranged in a basin shape with the surrounding high and middle low, and the shape of the housing 10 is not particularly limited here. There are various materials for forming the housing 10, and the housing 10 can be made of flexible materials, for example, the housing 10 is made of rubber, silica gel or a flexible plastic; the housing 10 can also be made of rigid materials, for example, the housing 10 is made of a hard plastic; and the housing 10 can also be made of composite materials, which are not listed here.

The housing 10 has an inner surface and an outer surface, where the inner surface of the housing 10 is defined as the surface, adjacent to the intelligent terminal, of the housing 10 and the outer surface of the housing 10 is defined as the surface, away from the intelligent terminal, of the housing 10. The inner surface of the housing 10 is provided with a mounting groove 10a, and the mounting groove 10a can be provided in an elongated shape, a circular shape, a rectangular shape and other shapes; the outer surface of the housing 10 is provided with a positioning groove 10b, the positioning groove 10b is arranged opposite the mounting groove 10a, and the positioning groove 10b can be arranged in an elongated shape, a circular shape, a rectangular shape and other shapes. The positioning groove 10b can be arranged in communication with or not in communication with the mounting groove 10a, and the number of the positioning grooves 10b can be one or more. When there is one positioning groove 10b, the positioning groove 10b is arranged corresponding to the plurality of the switching elements 50, and when there are a plurality of positioning grooves 10b, the plurality of positioning grooves 10b are arranged corresponding to the plurality of the switching elements 50 on a one-to-one basis.

The shape of the reinforcing sheet 20 can be of various types. The shape of the reinforcing sheet 20 can be provided in an elongated shape, a circular shape, a rectangular shape and other shapes; the shape of the reinforcing sheet 20 is generally adapted to the shape of the mounting groove 10a so as to facilitate the mounting of the reinforcing sheet 20 in the mounting groove 10a and cover a notch of the mounting groove 10a; the reinforcing sheet 20 can be made of a metal material, a metal oxide, a composite material and other materials. Preferably, the reinforcing sheet 20 is made of a metal material (such as metal aluminium, metal copper, stainless steel, etc.), and the metal material has the advantages of high strength and good bending resistance so as to ensure the supporting performance and bending resistance of the reinforcing sheet 20.

The RFID coil 30, also referred to as a radio frequency antenna, mainly plays a role in energy and information transmission. The RFID coil 30 is fixedly attached to the surface of the reinforcing sheet 20, that is to say, the RFID coil 30 can be integrally arranged in the mounting groove 10a, and it can also be a part of the RFID coil 30 that is arranged in the mounting groove 10a, and another part of the RFID coil 30 can be arranged on the inner surface, the outer surface or the inside of the housing 10. It should be noted that if another part of the RFID coil 30 is arranged outside the mounting groove 10a, the part, which is outside the mounting groove 10a, of the RFID coil 30 is preferably arranged inside the housing 10, so that the RFID coil 30 can be prevented from being exposed outside.

the plurality of the RFID chips 40 are all electrically connected to the RFID coil 30, and the plurality of the RFID chips 40 are arranged in parallel; the plurality of the RFID chips 40 and the RFID coil 30 can be electrically connected via wires; or the plurality of the RFID chips 40 are integrated on the RFID coil 30. The plurality of the RFID chips 40 are arranged in the mounting groove 10a; the plurality of the RFID chips 40 can be fixed on a groove wall of the mounting groove 10a; the plurality of the RFID chips 40 can also be fixed on the reinforcing sheet 20; and the plurality of the RFID chips 40 can also be arranged on the RFID coil 30, which is not limited thereto. The manner in which the plurality of the RFID chips 40 are fixed in the mounting groove 10a can be regardless.

The switching element 50 is an element that controls a circuit to turn on or off, and the switching element 50 may be a mechanical switch, an electronic switch, a capacitive switch, an inductive switch, etc. and the type of the switching element 50 is not particularly limited herein. The plurality of the switching elements 50 are mounted in the positioning groove 10b, and the plurality of the switching elements 50 are arranged correspondingly to the plurality of the RFID chips 40 on a one-to-one basis, namely, each switching element 50 is connected in series to a circuit where the corresponding RFID chip 40 is connected with the RFID coil 30. That is, each switching element 50 and the corresponding RFID chip 40 and RFID coil 30 are connected in series to form a circuit, the plurality of the switching elements 50 and the plurality of the RFID chips 40 and RFID the coil 30 form a plurality of circuits, the conduction of each circuit can generate an electronic tag, and the electronic tag generated by each circuit can be sensed and read by an NFC (Near Field Communication) module of the intelligent terminal.

When the intelligent terminal is assembled to the protection case of an intelligent terminal 100, an NFC sensing area of the intelligent terminal is arranged opposite a position on the housing 10 where the RFID coil 30 is arranged; when the intelligent terminal starts the NFC program, the NFC module of the intelligent terminal starts scanning the electronic tag; when one switching element 50 of the plurality of the switching elements 50 is conductive, a circuit formed by the conductive switching element 50 and the corresponding RFID chip 40 and the RFID coil 30 now generates an electronic tag, and after the NFC module of the intelligent terminal scans the electronic tag and reads the electronic tag, a controller of the intelligent terminal determines whether to execute a next action (such as opening a certain program, closing a certain program, suspending a certain program, closing the intelligent terminal, etc.), namely, determines whether the electronic tag is a control instruction in the intelligent terminal, and if so, a corresponding action is executed, and if not, no response is performed. With such arrangement, a shortcut instruction can be sent to the intelligent terminal through the protection case of an intelligent terminal 100, thereby facilitating the user to operate the intelligent terminal.

It should also be noted that the plurality of the switching elements 50 on the protection case of an intelligent terminal 100 can set a shortcut instruction according to the preference of a user, and the following description is made with the intelligent terminal being a smart phone as an example: after the NFC program of the smart phone is turned on, the NFC module of the smart phone starts to scan the electronic tag, and when the first switching element of the plurality of the switching elements 50 is conductive, the conductive circuit generates the first electronic tag at this moment, and the first electronic tag can be a shortcut instruction for the browser of the smart phone to be turned on or off; when a second switching element of the plurality of the switching elements 50 is conductive, the conductive circuit now generates a second electronic tag, which may be a shortcut instruction for the smart phone to answer or hang up.

When a third switching element of the plurality of the switching elements 50 is conductive, a conductive circuit generates a third electronic tag at this time, and the third electronic tag can be a shortcut instruction for a camera of a smart phone to open and a shutter to press; when a fourth switching element of the plurality of the switching elements 50 is conductive, the conductive circuit generates a fourth electronic tag at this time, and the fourth electronic tag can be a shortcut instruction for a smart phone to open a certain game App; when a fifth switching element in the plurality of the switching elements 50 is conductive, the conductive circuit generates a fifth electronic tag at this time, and the fifth electronic tag can be a shortcut instruction for popping an electric quantity reminding page of the smart phone; when a sixth switching element of the plurality of the switching elements 50 is conductive, the conductive circuit generates a sixth electronic tag at this moment, and the sixth electronic tag can be a switch of a smart phone to a certain instant messaging software APP. The shortcut instruction of the smart phone corresponding to each electronic tag on the protection case of an intelligent terminal 100 can be customized according to personal preferences, which are not listed one by one herein.

It should be noted that before use, the protection case of an intelligent terminal 100 needs to be communicatively connected with the intelligent terminal so as to customize the electronic tags generated when the circuits where the plurality of the switching elements 50 are located are conductive; when the electronic tags generated during conduction of the circuits where the plurality of the switching elements 50 are located are customized, the plurality of the switching elements 50 are activated successively and the corresponding circuits are conductive; the NFC module of the intelligent terminal senses successively and reads the corresponding electronic tags; and the intelligent terminal then customizes the electronic tags so that each electronic tag forms a quick instruction for the intelligent terminal to execute a certain action.

In the protection case of an intelligent terminal 100 of the present disclosure, the reinforcing sheet 20 is fixedly mounted in the mounting groove 10a, the RFID coil 30 is attached to the reinforcing sheet 20, the plurality of the RFID chips are arranged in parallel and are electrically connected to the RFID coil, and the plurality of the switching elements 50 are mounted in the positioning groove and are respectively connected in series to circuits where the corresponding RFID chips 40 are connected to the RFID coil 30. With such arrangement, on the one hand, the positioning of the flexible RFID coil 30 in the mounting groove 10a is facilitated, and on the other hand, the strength at which the housing 10 is provided with the mounting groove 10a and the positioning groove 10b can be increased by means of the reinforcing sheet 20, so that the thickness of the housing 10 can be made thinner.

Referring to FIGS. 2 to 5, in some embodiments of the present disclosure, the housing 10 includes a back plate 11 and a side plate 12 extending in the same direction from an edge of the back plate 11, wherein the side plate 12 and the back plate 11 together enclose a mounting cavity 10c for receiving the intelligent terminal, a surface, adjacent to the mounting cavity 10c, of the side plate 12 is concavely provided with a mounting groove 10a, and a surface, facing away from the mounting cavity 10c, of the side plate 12 is concavely provided with a positioning groove 10b. With such arrangement, it is convenient to quickly position and assemble the intelligent terminal on the housing 10, and at the same time, it is also convenient to set the position where the housing 10 is provided with the RFID coil 30 opposite the NFC sensing area of the intelligent terminal.

It should be noted that a thickness of the side plate 12 generally corresponds to a thickness of the back plate 11, and although the arrangement of the mounting groove 10a and the positioning groove 10b may result in a decrease in the strength and bending resistance capacity of a part of the side plate 12, after the reinforcing sheet 20 is fitted into the mounting groove 10a, since the strength and bending resistance capacity of the reinforcing sheet 20 itself are relatively high, the strength and bending resistance capacity of the side plate 12 can be improved by the reinforcing sheet 20, so that the strength and bending resistance capacity of the side plate 12 are equivalent everywhere, that is, the arrangement of the reinforcing sheet 20 enables the thickness of the side plate 12 to be made thinner.

In addition, it should also be noted that the side plate 12 is also generally provided with a first through-hole corresponding to a key of a side face of the intelligent terminal, a second through-hole corresponding to an earphone hole of the side face of the intelligent terminal, a third through-hole corresponding to a charging hole of the side face of the intelligent terminal, and the number of the first through-hole (s), the second through-hole(s) and the third through-hole(s) can be set according to the corresponding intelligent terminal; the back plate 11 is provided with a camera window corresponding to a camera on the intelligent terminal, and the shape of the camera window can be a circle, a square, a polygon, etc.

Further, referring to FIGS. 4, 5, 10 and 11, the back plate 11 has a first region 11a arranged opposite an NFC sensing area of the intelligent terminal and a second region 11b arranged opposite a wireless charging sensing area of the intelligent terminal, the first region 11a and the second region 11b are spaced apart, the mounting groove 10a is arranged adjacent to the first region 11a and spaced apart from the second region 11b, a part of the RFID coil 30 is arranged in the first region 11a, and another part of the RFID coil 30 is arranged in the mounting groove 10a. With this arrangement, it is possible to prevent the RFID coil 30 and the reinforcing sheet 20 made of a metal material from affecting the intelligent terminal to perform wireless charging, and also to prevent the RFID coil 30 and the reinforcing sheet 20 made of a metal material from being affected by the wireless charging electromagnetic field.

Based on the above-mentioned solutions, in some embodiments of the present disclosure, the RFID chips have a frequency in the range of 10 MHz to 15 MHz; preferably, the RFID chips 40 have a frequency of 13.56 MHz; since the frequency of the RFID chips 40 is 13.56 MHZ, the RFID chips 40 with this frequency do not need to be powered by a power supply in use; in addition, when two or more switching elements 50 in the plurality of the switching elements 50 are conductive at the same time, since the energy transmitted from the intelligent terminal that the RFID coil 30 receives stays unchanged, but the conduction of two or more circuits would result in the frequency of the RFID coil 30 being too low, the electronic tags generated by the RFID chips in the two or more conduction circuits are not able to be sensed by the NFC module of the intelligent terminal; therefore, selecting the RFID chips in the above-mentioned frequency range can also achieve the effect of conduction of one RFID chip selected from the plurality of the RFID chips in parallel.

That is to say, in the above-mentioned technical solution, by selecting the RFID chips 40 with a frequency within 10 MHz to 15 MHZ, on the one hand, the protection case of an intelligent terminal 100 does not need to be provided with a power supply or an external power supply, which enables the thickness of the housing 10 to be made thinner, and on the other hand, one selected from the plurality of RFID chips connected in parallel is conductive, thus avoiding the problem that a user presses two or more switching elements at the same time, which results in that the intelligent terminal needs to perform two or more actions synchronously, thus affecting the normal operation of the intelligent terminal.

In some embodiments of the present disclosure, the RFID coil 30 and the reinforcing sheet 20 are adhesively fixed to by a double-sided adhesive, wherein both sides of the double-sided adhesive have adhesive properties, so as to facilitate the bonding and fixing of the reinforcing sheet 20 and the RFID coil 30; in addition, the double-sided adhesive tape has an insulating property, and when the reinforcing sheet 20 is made of a metal material, the double-sided adhesive tape can also insulate and connect the reinforcing sheet 20 with the RFID coil 30, thus avoiding the reinforcing sheet 20 affecting the operation of the RFID coil 30; in addition, the space between the reinforcing sheet 20 and the RFID coil 30 can be adjusted according to the actual situation by using the double-sided tape, so that the space of the mounting groove 10a can be fully utilized to ensure the mounting of the RFID chips 40, the switching elements 50 and other structural members.

Figure 8:
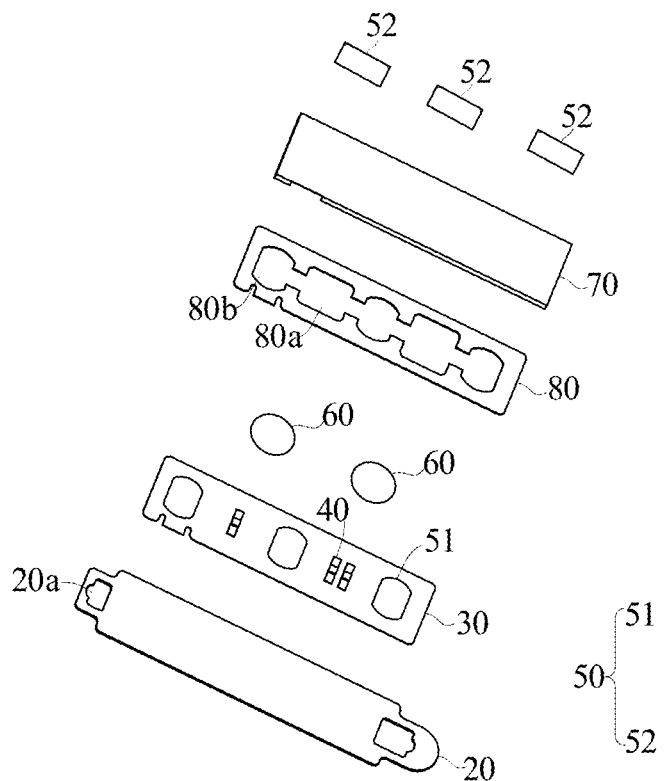
FIG. 8 is an exploded diagram of a reinforcing sheet, the RFID coil, the RFID chips, the switching elements, an encapsulation film, a polyester film, and a PET sheet of the protection case of an intelligent terminal of the present disclosure.
Figure 11:
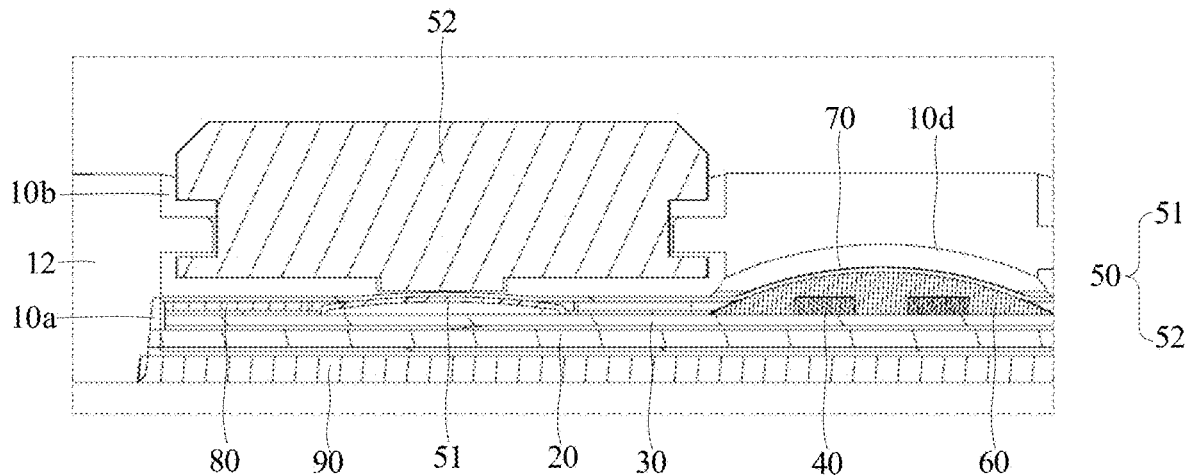
FIG. 11 is an enlarged schematic diagram of portion C in FIG. 10.

Referring to FIGS. 8 and 11, in some embodiments of the present disclosure, the RFID coil 30 is provided on a side, facing a groove bottom of the mounting groove 10a, of the reinforcing sheet 20, the plurality of the RFID chips 40 are provided on a side, facing the groove bottom of the mounting groove 10a, of the RFID coil 30 and the plurality of the RFID chips 40 are encapsulated by an encapsulation film 60. With this arrangement, on the one hand, it is avoided that the RFID chips 40 are exposed from a notch of the mounting groove 10a, and on the other hand, the RFID chips 40 are fully covered by the encapsulation film 60. A thickness of the encapsulation film 60 itself is relatively thin, and thus when the encapsulation film 60 covers the RFID chips 40, the space occupied by the RFID chips 40 is hardly affected. At the same time, the arrangement of the encapsulation film 60 can avoid the problem that the RFID chip 40 is in direct contact with the groove bottom of the mounting groove 10a and is worn away.

Figure 3:
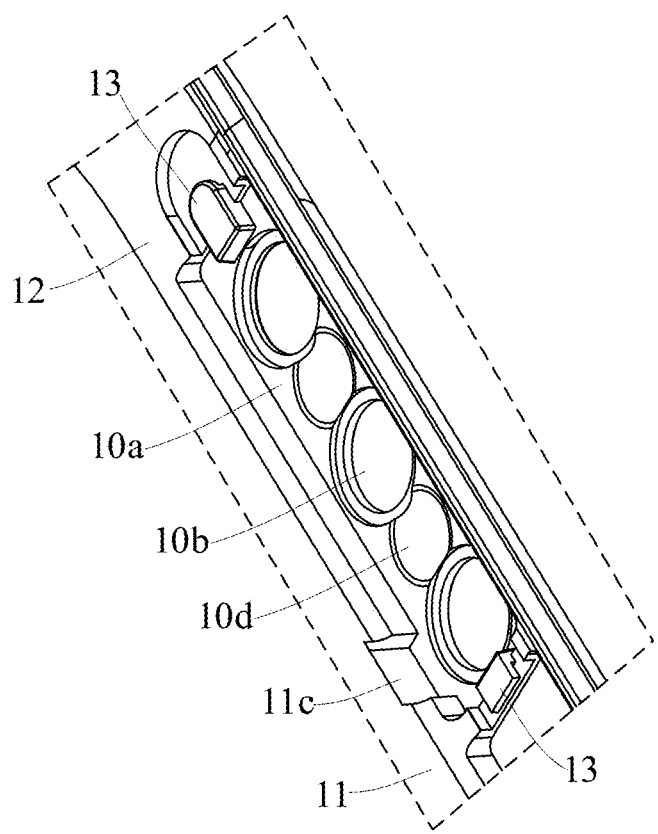
FIG. 3 is an enlarged schematic diagram of portion A in FIG. 2.
Figure 4:
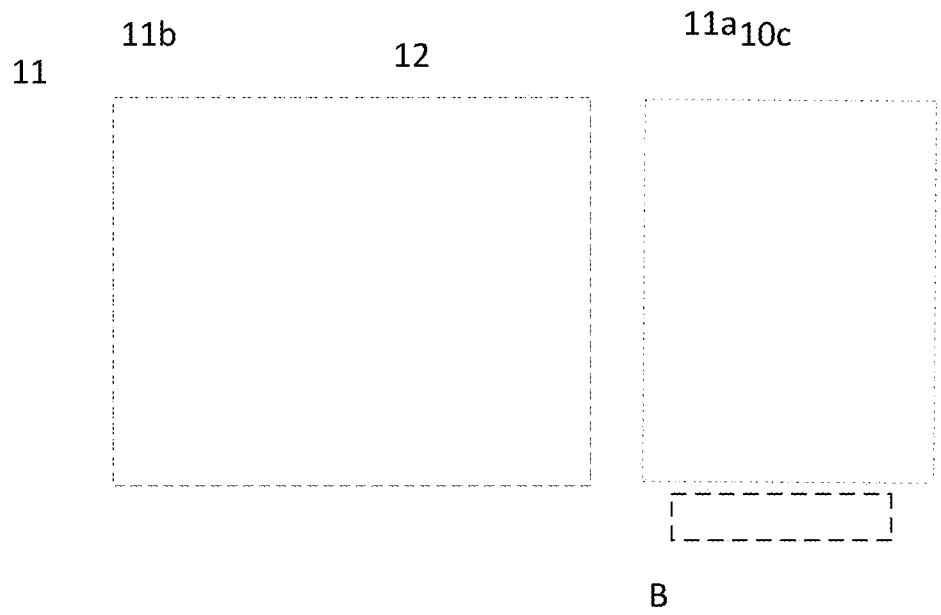
FIG. 4 is a sectional diagram of the housing in FIG. 1.
Figure 5:
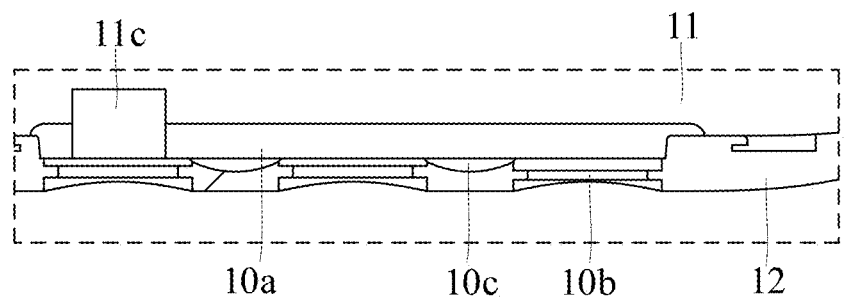
FIG. 5 is an enlarged schematic diagram of portion B in FIG. 4.
Figure 6:
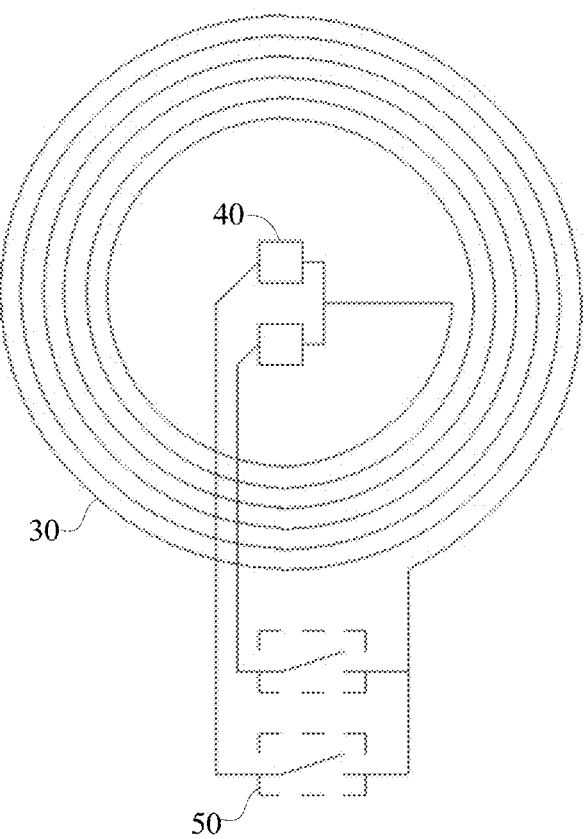
FIG. 6 is a schematic diagram of an embodiment of an RFID coil and a plurality of RFID chips and a plurality of switching elements in the protection case of an intelligent terminal of the present disclosure.

Further, referring to FIGS. 3, 5 and 11, in some embodiments of the present disclosure, a plurality of avoidance recesses 10d are concavely provided in the groove bottom of the mounting groove 10a, and each of the plurality of avoidance recesses 10d is used to avoid the RFID chips 40. It should be noted that the avoidance recesses 10d and the RFID chips 40 may be arranged on a one-to-one basis, so that the problem that the plurality of the RFID chips 40 directly contact with the groove bottom of the mounting groove 10a and are worn away is avoided.

In addition, it should be noted that although the groove bottom of the mounting groove 10a is provided with a plurality of avoidance recesses 10d, which further reduces the thickness of the housing 10 at the position where the mounting groove 10a is opened, the mounting groove 10a is internally provided with the reinforcing sheet 20, the reinforcing sheet 20 itself has a relatively high strength, and the reinforcing sheet 20 also has a relatively high bending resistance, thus ensuring the strength and bending resistance of the housing 10 at the position where the mounting groove 10a and the positioning groove 10b are opened.

With reference to FIGS. 8 and 11, in some embodiments of the present disclosure, the positioning groove 10b is provided in communication with the mounting groove 10a, and each switching element 50 includes a push-type button 51 and a key cap 52, wherein each push-type button 51 forms a circuit in series with the RFID coil 30 and the corresponding RFID chip 40, each push-type button 51 is provided at a position opposite the positioning groove 10b of the RFID coil 30, each key cap 52 cooperates with the positioning groove 10b, and the key cap 52 can reciprocate along the positioning groove 10b so as to abut against or release the corresponding push-type button 51; thus, the corresponding push-type button 51 is turned on or off from the circuit in which the corresponding RFID chip 40 and the RFID coil 30 are located.

It should be noted that the above-mentioned push-type button 51 may be a soft rubber button, a film button, a snap dome button and other types of buttons, which are not listed here. Preferably, the push-type button 51 is a snap dome button, and a thickness of the snap dome button is relatively small, so that a thickness of the RFID coil 30 and the snap dome button as a whole can be made 0.3 mm or less, so that a depth of the mounting groove 10a can be made relatively small, and further, a thickness of the housing 10 can be made relatively thin. In addition, the snap dome button can be automatically reset when an external force is removed, thus making the switching elements 50 easy to operate and suitable for use by a special population such as the elderly.

Referring to FIG. 11, in some embodiments of the present disclosure, the protection case of an intelligent terminal 100 further includes a polyester film 70 for covering the reinforcing sheet 20, the RFID coil 30, the RFID chips 40, and arrangement of the push-type button 51. With this arrangement, on the one hand, it is possible to provide a dustproof function by the polyester film 70, and on the other hand, since the polyester film 70 itself has a relatively good moisture resistance, it is possible to prevent moisture in the outside air from entering the mounting groove 10a through the positioning groove 10b and affecting the normal operation of the RFID coil 30, the RFID chips 40 and the button 51.

In addition, a thickness of the polyester film 70 is very thin, and the polyester film 70 encapsulating the reinforcing sheet 20, the RFID coil 30, the RFID chips 40 and the button 51 does not cause a thickness of the whole body to vary too much, and specifically, an overall thickness of the reinforcing sheet 20, the RFID chips 40, the RFID coil 30 and the snap dome button encapsulated with the polyester film 70 is 0.8 mm or less, that is, the polyester film 70 does not cause the thickness of the housing 10 to increase.

Further, referring to FIGS. 8 and 11, in some embodiments of the present disclosure, the protection case of an intelligent terminal 100 further includes a PET (polyethylene glycol terephthalate) sheet 80, wherein the PET sheet 80 is penetratingly provided with a first avoidance hole 80a at a position corresponding to the RFID chips 40, the PET sheet 80 is penetratingly provided with a second avoidance hole 80b at a position corresponding to the button, one side of the PET sheet 80 is connected to the polyester film 70, and the other side of the PET sheet 80 is adhesively fixed to to the RFID coil 30 via a double-sided adhesive.

It should be noted that the first avoidance hole 80a on the PET sheet 80 can be arranged corresponding to one or more RFID chips 40, and the second avoidance hole 80b on the PET sheet 80 can be arranged correspondingly to one or more buttons 51, that is to say, the button(s) 51 on the RFID coil 30 and a periphery of the RFID chip(s) 40 are closed by the PET sheet 80, and the PET sheet 80 has relatively good gas, water, oil and odor-barrier properties; and using the PET sheet 80 and the polyester film 70 in cooperation can further improve the effects of waterproof and dustproof. In addition, the PET sheet 80 has a thickness that ensures that the RFID chips 40 on the RFID coil 30 are spaced from the groove bottom of the mounting groove 10a.

Obviously, the above-mentioned switching elements 50 can also be another type of switching elements 50. In some embodiments of the present disclosure, the switching element 50 is a reset knob switch, the reset knob switch includes a knob switch and a reset toggle wheel, the reset toggle wheel is rotatably mounted on the housing 10, a reset torsion spring is further provided between the reset toggle wheel and the housing 10, the reset toggle wheel drives the knob switch to rotate together under the action of an external force, and when the knob switch rotates by a preset angle and is conductive, the knob switch is conductive with the corresponding RFID chip 40 and the RFID coil 30 and generates an electronic tag. When the reset toggle wheel is released, the reset toggle wheel is reset to the initial position under the action of the reset torsion spring, and the knob switch is also switched from the on state to the off state.

It should be noted that the above-mentioned switching element 50 can also be another type of switching element 50, for example, the above-mentioned switching element 50 can be an electronic switch, and the types of the electronic switch include all the electronic components with a switch function, such as a MOS tube, a triode, a relay, a solid state relay, an opto-electric coupler, an analogue switch, etc. and at this time, the protection case of an intelligent terminal 100 further includes a power supply module or a power supply connector, and the electronic switch is electrically connected to the power supply module or the power supply connector, and the electronic switch can are conductive by means of tapping, shaking, pressing and touching.

With reference to FIGS. 3 and 8, in some embodiments of the present disclosure, the mounting groove 10a is provided in an elongated shape, the groove bottom of the mounting groove 10a is provided with two positioning posts 13, and the two positioning posts 13 are arranged at an interval in a length direction of the mounting groove 10a; the reinforcing sheet 20 is provided in a long strip shape, two ends of the reinforcing sheet 20 in a longitudinal direction are both penetratingly provided with positioning holes 20a, and the two positioning holes 20a are in plug-fit with the two positioning posts 13 on a one-to-one basis. This is provided to facilitate the positioning and mounting of the sheet 20 in the mounting groove 10a, thereby facilitating the fitting of the reinforcing sheet 20 in the mounting groove 10a.

Figure 7:
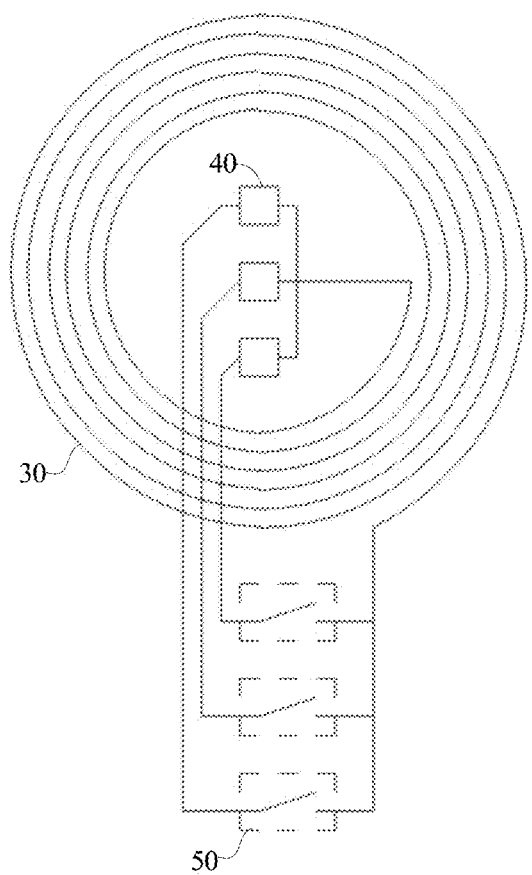
FIG. 7 is a schematic diagram of another embodiment of the RFID coil and the plurality of the RFID chips and the plurality of the switching elements in the protection case of an intelligent terminal of the present disclosure.

It should be noted that a side, facing the notch of the mounting groove 10a, of the reinforcing sheet 20 can be filled with foam and rubber; with reference to FIGS. 5 and 7, a side, facing the notch of the mounting groove 10a, of the reinforcing sheet 20 can also be covered with a decorative plate 90 made of polycarbonate (PC) material; the decorative plate 90 can be fixed by bonding with the side plate 12 via glue; the decorative plate 90 can also be fixedly connected with the side plate 12 via ultrasonic welding; and the decorative plate 90 can also be fixedly connected with the side plate 12 in other manners, which are not listed here one by one. Since the decorative plate 90 itself has a high strength, this makes it possible to further enhance the strength where the housing 10 is opened with the mounting groove 10a.

Further, referring to FIGS. 3 and 5, in some embodiments of the present disclosure, fitting holes 90a are provided at both ends of the decorative plate 90 in a longitudinal direction, the two fitting holes 90a cooperate with the two positioning posts 13, the decorative plate 90 and the reinforcing sheet 20 are fixed via bonding by a double-sided adhesive, and the decorative plate 90 is used to cover the mounting groove 10a, so that the decorative plate 90 is conveniently located and mounted on the side plate 12 of the housing 10, thereby facilitating the fixed mounting of the decorative plate 90 on the side plate 12.

Figure 9:
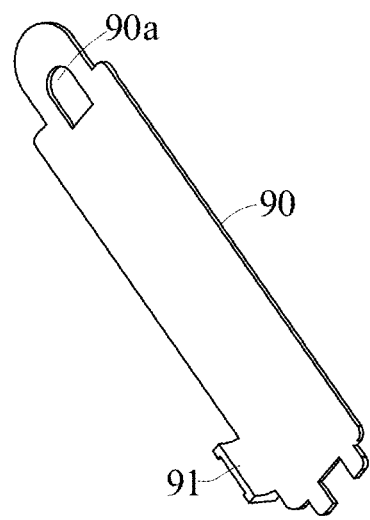
FIG. 9 is a schematic structural diagram of a decorative plate of the protection case of an intelligent terminal of the present disclosure.
Figure 10:
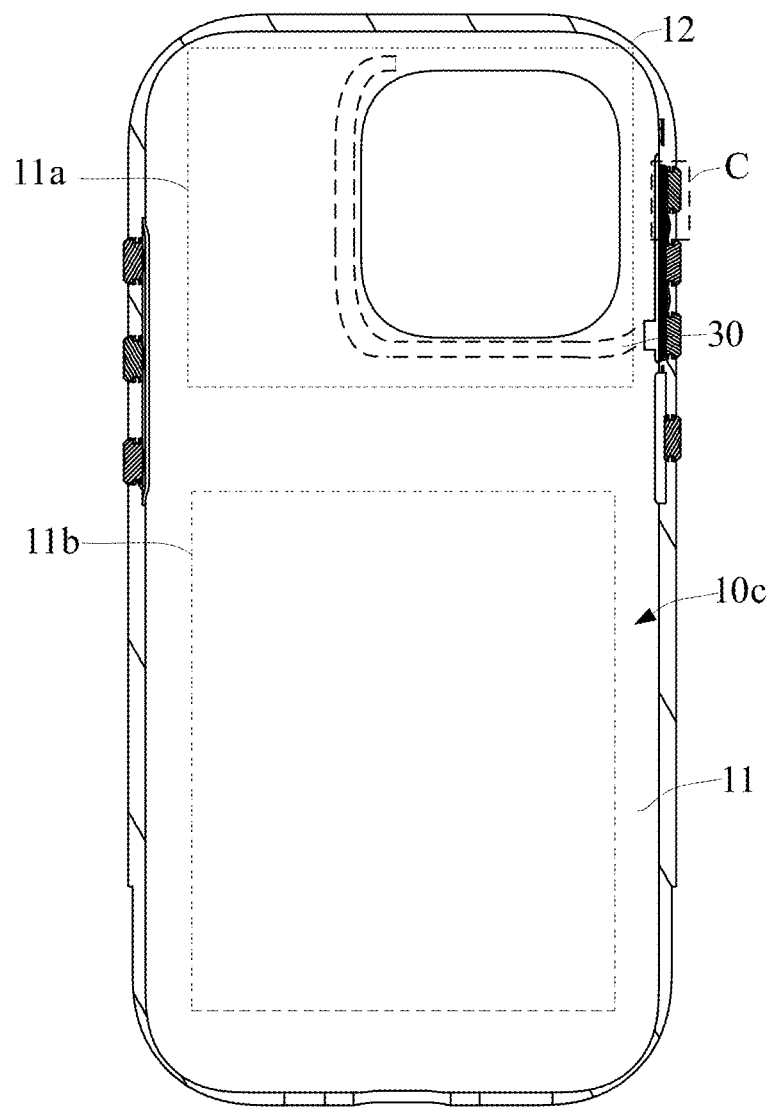
FIG. 10 is a cross-sectional diagram of the protection case of an intelligent terminal in FIG. 1.

Furthermore, with reference to FIGS. 3, 5 and 9, a wiring notch 11c communicating with the mounting groove 10a is provided at a position, adjacent to the mounting groove 10a, of the back plate 11, a capping block 91 is provided at a side, adjacent to the back plate 11, of the decorative plate 90, and the capping block 91 cooperates with the wiring notch 11c and covers the wiring notch 11c. With such arrangement, on the one hand, the RFID coil 30 can be hidden inside the housing 10, and on the other hand, when the decorative plate 90 is assembled with the side plate 12, the capping block 91 can also play a foolproof function. In addition, the engagement of the capping block 91 with the wiring notch 11c also limits the decorative plate 90 along the length direction of the mounting groove 10a.

Figure 12:
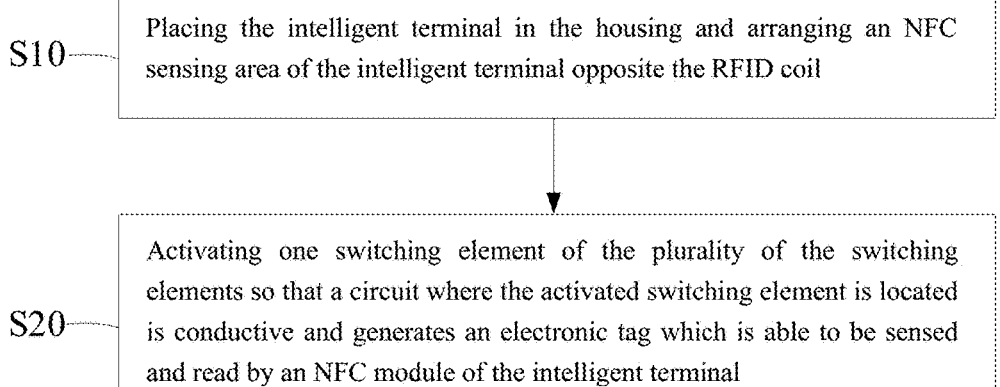
FIG. 12 is a schematic flow diagram of an embodiment of a method for using a protection case of an intelligent terminal of the present disclosure.

With reference to FIG. 12, the present disclosure also proposes a method for using a protection case of an intelligent terminal 100, wherein the protection case of an intelligent terminal 100 is as described above in various embodiments, and the method for using the protection case of an intelligent terminal 100 includes:

step S10: placing the intelligent terminal in the housing and arranging an NFC sensing area of the intelligent terminal opposite the RFID coil; and step S20: activating one switching element of the plurality of the switching elements so that a circuit where the activated switching element is located is conductive and generates an electronic tag which is able to be sensed and read by an NFC module of the intelligent terminal.

When the intelligent terminal is assembled to the protection case of an intelligent terminal 100, an NFC sensing area of the intelligent terminal is arranged opposite a position on the housing 10 where the RFID coil 30 is arranged; when the intelligent terminal starts the NFC program, the NFC module of the intelligent terminal starts scanning the electronic tag; when one switching element 50 of the plurality of the switching elements 50 is conductive, a circuit formed by the conductive switching element 50 and the corresponding RFID chip 40 and the RFID coil 30 now generates an electronic tag, and after the NFC module of the intelligent terminal scans the electronic tag and reads the electronic tag, a controller of the intelligent terminal determines whether to execute a next action (such as opening a certain program, closing a certain program, suspending a certain program, closing the intelligent terminal, etc.), namely, determines whether the electronic tag is a control instruction in the intelligent terminal, and if so, a corresponding action is executed, and if not, no response is performed. With such arrangement, a shortcut instruction can be sent to the intelligent terminal through the protection case of an intelligent terminal 100, thereby facilitating the user to operate the intelligent terminal.

It should also be noted that the plurality of the switching elements 50 on the protection case of an intelligent terminal 100 can set a shortcut instruction according to the preference of a user, and the following description is made with the intelligent terminal being a smart phone as an example: after the NFC program of the smart phone is turned on, the NFC module of the smart phone starts to scan the electronic tag, and when the first switching element of the plurality of the switching elements 50 is conductive, the conductive circuit generates the first electronic tag at this moment, and the first electronic tag can be a shortcut instruction for the browser of the smart phone to be turned on or off; when a second switching element of the plurality of the switching elements 50 is conductive, the conductive circuit now generates a second electronic tag, which may be a shortcut instruction for the smart phone to answer or hang up.

When a third switching element of the plurality of the switching elements 50 is conductive, a conductive circuit generates a third electronic tag at this time, and the third electronic tag can be a shortcut instruction for a camera of a smart phone to open and a shutter to press; when a fourth switching element of the plurality of the switching elements 50 is conductive, the conductive circuit generates a fourth electronic tag at this time, and the fourth electronic tag can be a shortcut instruction for a smart phone to open a certain game App; when a fifth switching element in the plurality of the switching elements 50 is conductive, the conductive circuit generates a fifth electronic tag at this time, and the fifth electronic tag can be a shortcut instruction for popping an electric quantity reminding page of the smart phone; when a sixth switching element of the plurality of the switching elements 50 is conductive, the conductive circuit generates a sixth electronic tag at this moment, and the sixth electronic tag can be a switch of a smart phone to a certain instant messaging software APP. The shortcut instruction of the smart phone corresponding to each electronic tag on the protection case of an intelligent terminal 100 can be customized according to personal preferences, which are not listed one by one herein.

It should be noted that before use, the protection case of an intelligent terminal 100 needs to be communicatively connected with the intelligent terminal so as to customize the electronic tags generated when the circuits where the plurality of the switching elements 50 are located are conductive; when the electronic tags generated during conduction of the circuits where the plurality of the switching elements 50 are located are customized, the plurality of the switching elements 50 are activated successively and the corresponding circuits are conductive; the NFC module of the intelligent terminal senses successively and reads the corresponding electronic tags; and the intelligent terminal then customizes the electronic tags so that each electronic tag forms a quick instruction for the intelligent terminal to execute a certain action.

Figure 13:
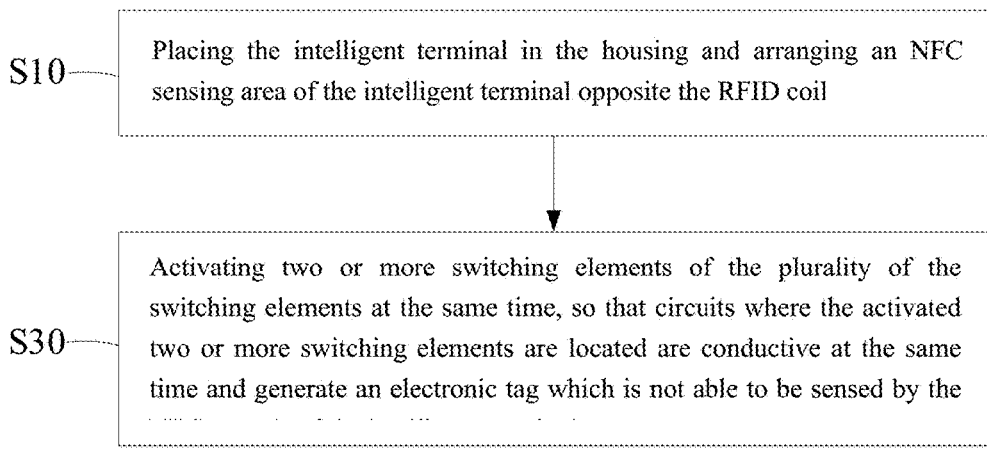
FIG. 13 is a schematic flow diagram of another embodiment of a method for using a protection case of an intelligent terminal of the present disclosure.

With reference to FIG. 13, the RFID chips 40 have a frequency in a range of 10 MHz to 15 MHz, and a method for using the protection case of an intelligent terminal 100 further includes: step S30: activating two or more switching elements of the plurality of the switching elements at the same time, so that circuits where the activated two or more switching elements are located are conductive at the same time and generate an electronic tag which is not able to be sensed by the NFC module of the intelligent terminal.

Since the frequency of the RFID chips 40 is 10 MHz to 15 MHZ, preferably, the frequency of the RFID chips 40 is 13.56 MHz, and the RFID chips 40 with this frequency do not need to be powered by a power supply in use; in addition, when two or more switching elements 50 in the plurality of the switching elements 50 are conductive at the same time, since the energy transmitted from the intelligent terminal that the RFID coil 30 receives stays unchanged, but the conduction of two or more circuits would result in the frequency of the RFID coil 30 being too low, the electronic tags generated by the RFID chips in the two or more conduction circuits are not able to be sensed by the NFC module of the intelligent terminal; therefore, selecting the RFID chips in the above-mentioned frequency range can also achieve the effect of conduction of one RFID chip selected from the plurality of the RFID chips in parallel.

That is to say, in the above-mentioned technical solution, by selecting the RFID chips 40 with a frequency within 10 MHz to 15 MHZ, on the one hand, the protection case of an intelligent terminal 100 does not need to be provided with a power supply or an external power supply, which enables the thickness of the housing 10 to be made thinner, and on the other hand, one selected from the plurality of RFID chips connected in parallel is conductive, thus avoiding the problem that a user presses two or more switching elements at the same time, which results in that the intelligent terminal needs to perform two or more actions synchronously, thus affecting the normal operation of the intelligent terminal.

Finally, it should be noted that the above-mentioned embodiments are merely illustrative of the technical solution of the present disclosure, and are not restrictive. Although the present disclosure has been described in detail with reference to the foregoing embodiments, a person skilled in the art will appreciate that the technical solutions disclosed in the above-mentioned embodiments can still be amended, or some of the technical features thereof can be replaced with equivalents. Such modifications and substitutions do not depart the substance of the corresponding technical solution from the spirit and scope of the technical solutions of the embodiments of the present disclosure.

The invention claimed is:

1. A protection case of an intelligent terminal, comprising a housing, a reinforcing sheet, a RFID coil, a plurality of RFID chips and a plurality of switching elements, wherein
an inner surface of the housing is provided with a mounting groove, an outer surface of the housing is provided with a positioning groove, and the positioning groove is arranged opposite the mounting groove;
the reinforcing sheet is arranged in the mounting groove;
the RFID coil is fixedly attached to the reinforcing sheet;
the plurality of the RFID chips are mounted in the mounting groove and are electrically connected to the RFID coil, and the plurality of the RFID chips are arranged in parallel; and
the plurality of the switching elements are mounted in the positioning groove, and the plurality of the switching elements are respectively connected in series to circuits where the corresponding RFID chips are connected with the RFID coil.

2. The protection case of an intelligent terminal according to claim 1, wherein the housing comprises a back plate and a side plate extending in the same direction from an edge of the back plate, the back plate and the side plate together enclosing a mounting cavity for receiving the intelligent terminal, the mounting groove is concavely provided on a side plate surface adjacent to the mounting cavity, of the side plate being concavely provided with and the positioning groove is provided on a side plate surface facing away from the mounting cavity.

3. The protection case of an intelligent terminal according to claim 2, wherein the back plate has a first region arranged opposite an NFC sensing area of the intelligent terminal and a second region arranged opposite a wireless charging sensing area of the intelligent terminal, the first region and the second region being spaced apart, the mounting groove being arranged adjacent to the first region and spaced apart from the second region, the RFID coil having a portion arranged in the first region and the RFID coil having another portion arranged in the mounting groove.

4. The protection case of an intelligent terminal according to claim 1, wherein the RFID chips have a frequency in the range of 10 MHz to 15 MHz.

5. The protection case of an intelligent terminal according to claim 1, wherein the RFID coil is adhesively fixed to the reinforcing sheet via bonding by a double-sided adhesive.

6. The protection case of an intelligent terminal according to claim 1, wherein the RFID coil is provided on a side, facing a groove bottom of the mounting groove, of the reinforcing sheet, the plurality of the RFID chips are all provided on a side, facing the groove bottom of the mounting groove, of the RFID coil and the plurality of the RFID chips are all encapsulated by an encapsulation film.

7. The protection case of an intelligent terminal according to claim 6, wherein a plurality of avoidance recesses are concavely provided in the groove bottom of the mounting groove, and the plurality of the avoidance recesses are all configured for avoiding arrangement of the RFID chips.

8. The protection case of an intelligent terminal according to claim 1, wherein the positioning groove is provided in communication with the mounting groove, the switching element comprises a push-type button and a key cap, the push-type button forming a circuit in series with the RFID coil and the corresponding RFID chip, the push-type button being provided at a position where the RFID coil is opposite to the positioning groove, and the key cap cooperating with the positioning groove and being able to reciprocate along the positioning groove to press or release the push-type button.

9. The protection case of an intelligent terminal according to claim 8, wherein the push-type button is a snap dome button.

10. The protection case of an intelligent terminal according to claim 8, wherein the RFID chips are arranged on a side, facing the positioning groove, of the RFID coil, and the protection case of an intelligent terminal further comprises a polyester film, the polyester film covering the reinforcing sheet, the RFID coil, the plurality of the RFID chips, and the button.

11. The protection case of an intelligent terminal according to claim 10, wherein the protection case of an intelligent terminal further comprises a PET sheet, wherein the PET sheet is penetratingly provided with a first avoidance hole at a position corresponding to the RFID chip, the PET sheet is penetratingly provided with a second avoidance hole at a position corresponding to the button, wherein one side of the PET sheet abuts against the polyester film, and the other side of the PET sheet is adhesively fixed to the RFID coil via a double-sided adhesive.

12. The protection case of an intelligent terminal according to claim 1, wherein the switching element is a self-resetting knob switch; alternatively, the switching element is an electronic switch, and the protection case of an intelligent terminal further comprises a power supply module or a power supply connector, and the electronic switch is electrically connected to the power supply module or the power supply connector.

13. The protection case of an intelligent terminal according to claim 1, wherein the protection case further comprising a decorative plate arranged on a side, facing away from the positioning groove, of the reinforcing sheet, the decorative plate covering a notch of the mounting groove.

14. A method for using a protection case of an intelligent terminal, wherein the protection case of an intelligent terminal comprises a housing, a reinforcing sheet, a RFID coil, a plurality of RFID chips and a plurality of switching elements, wherein
an inner surface of the housing is provided with a mounting groove, an outer surface of the housing is provided with a positioning groove, and the positioning groove is arranged opposite the mounting groove; the reinforcing sheet is arranged in the mounting groove; the RFID coil is fixedly attached to the reinforcing sheet; the plurality of the RFID chips are mounted in the mounting groove and are electrically connected to the RFID coil, and the plurality of the RFID chips are arranged in parallel; and the plurality of the switching elements are mounted in the positioning groove, and the plurality of the switching elements are respectively connected in series to circuits where the corresponding RFID chips are connected with the RFID coil, the method comprises:
step S10: placing the intelligent terminal in the housing and arranging an NFC sensing area of the intelligent terminal opposite the RFID coil; and
step S20: activating one switching element of the plurality of the switching elements so that a circuit where the activated switching element is located is conductive and generates an electronic tag which is able to be sensed and read by an NFC module of the intelligent terminal.

15. The method for using a protection case of an intelligent terminal according to claim 14, characterized in that the RFID chips have a frequency in the range of 10 MHz to 15 MHz, and the method for using a protection case of an intelligent terminal further comprises:
    step S30: activating two or more switching elements of the plurality of the switching elements at the same time, so that circuits where the activated two or more switching elements are located are conductive at the same time and generate an electronic tag which is not able to be sensed by the NFC module of the intelligent terminal.

\* \* \* \* \*